US011831737B2

(12) United States Patent
Kunimatsu

(10) Patent No.: US 11,831,737 B2
(45) Date of Patent: Nov. 28, 2023

(54) COMMUNICATION APPARATUS, METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventor: Aran Kunimatsu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/861,336

(22) Filed: Jul. 11, 2022

(65) Prior Publication Data
US 2023/0019312 A1 Jan. 19, 2023

(30) Foreign Application Priority Data
Jul. 16, 2021 (JP) .................. 2021-118128

(51) Int. Cl.
*H04L 67/60* (2022.01)
*H04L 67/02* (2022.01)

(52) U.S. Cl.
CPC .............. *H04L 67/60* (2022.05); *H04L 67/02* (2013.01)

(58) Field of Classification Search
CPC ..... H04L 67/02; H04L 61/4511; H04L 67/564
See application file for complete search history.

(56) References Cited

U.S. PATENT DOCUMENTS 6,956,663 B1 * 10/2005 Iida .................... H04N 1/00204
379/100.06
7,313,823 B2 * 12/2007 Gao ....................... H04L 63/12
713/185
(Continued)

FOREIGN PATENT DOCUMENTS

JP    H01-286652 A    11/1989

OTHER PUBLICATIONS

Dusseault, L., Ed., "HTTP Extensions for Web Distributed Authoring and Versioning (WebDAV)", RFC 4918, DOI 10.17487/RFC4918, Jun. 2007, https://www.rfc-editor.org/info/rfc4918 (Year: 2007).*

*Primary Examiner* — Chirag R Patel
(74) *Attorney, Agent, or Firm* — VENABLE LLP

(57) ABSTRACT

A communication apparatus for communicating with an information processing apparatus includes a memory containing instructions and a processor to execute the instructions to function as a communication unit to perform communication between the communication apparatus and the information processing apparatus, an analysis unit to analyze an execution request of a function of the communication apparatus using a predetermined communication protocol that has been received from the information processing apparatus, and an execution unit to, when the execution request of the function is determined to not comply with a specification of the predetermined communication protocol because the execution request of the function does not include header information as a result of the analysis by the analysis unit, transmit a response using the predetermined communication protocol on condition that at least the execution request of the function is an execution request of a specific function, and execute the specific function.

16 Claims, 10 Drawing Sheets

(56) References Cited

U.S. PATENT DOCUMENTS

| | | | |
|---|---|---|---|
| 2001/0029521 A1* | 10/2001 | Matsuda | G06F 3/1259 |
| | | | 709/201 |
| 2005/0188221 A1* | 8/2005 | Motsinger | G06F 21/55 |
| | | | 709/224 |
| 2006/0059462 A1* | 3/2006 | Yamamoto | G03G 15/5079 |
| | | | 707/E17.107 |
| 2017/0078384 A1* | 3/2017 | Trandafir | H04L 67/06 |

* cited by examiner

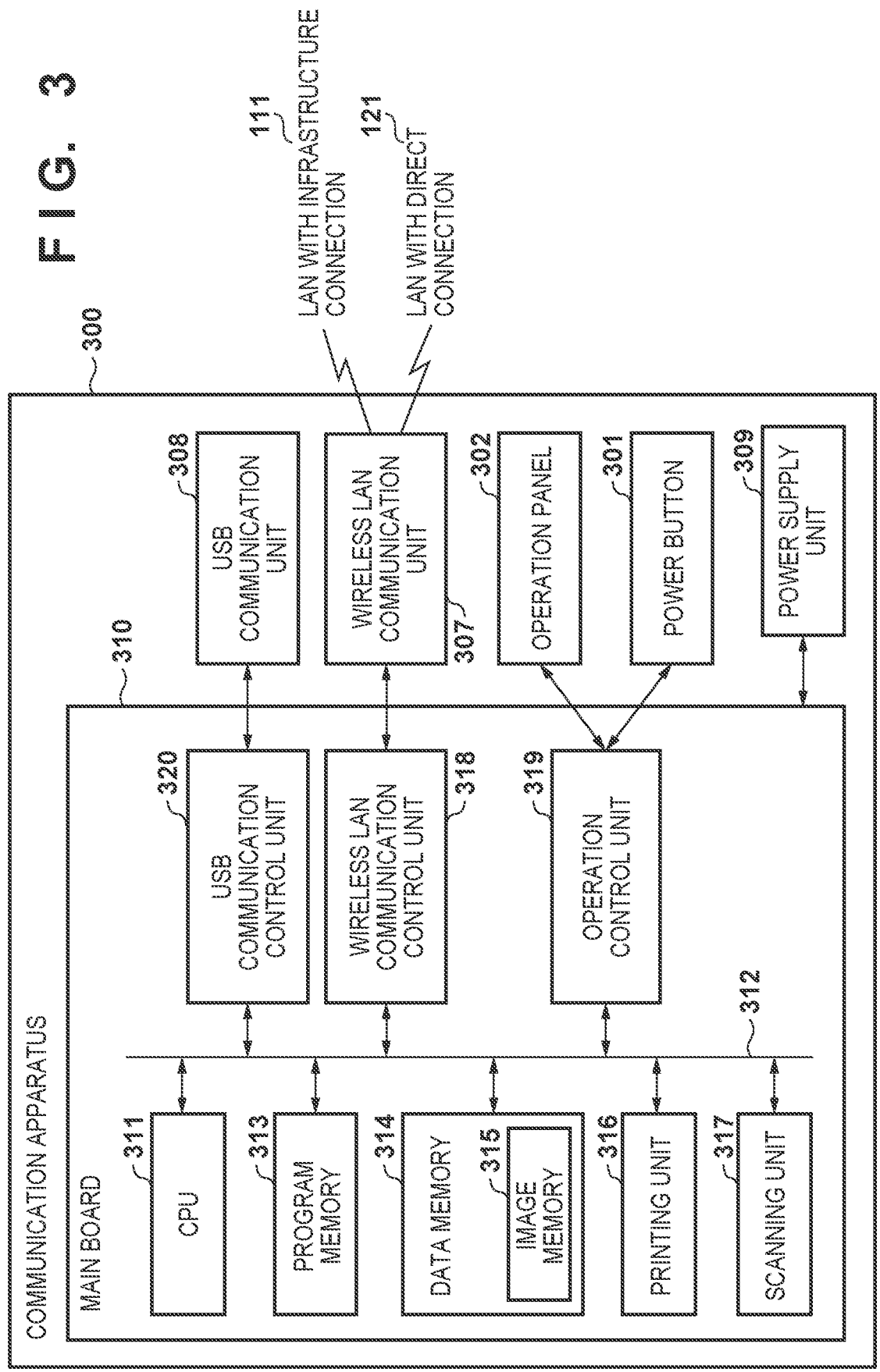

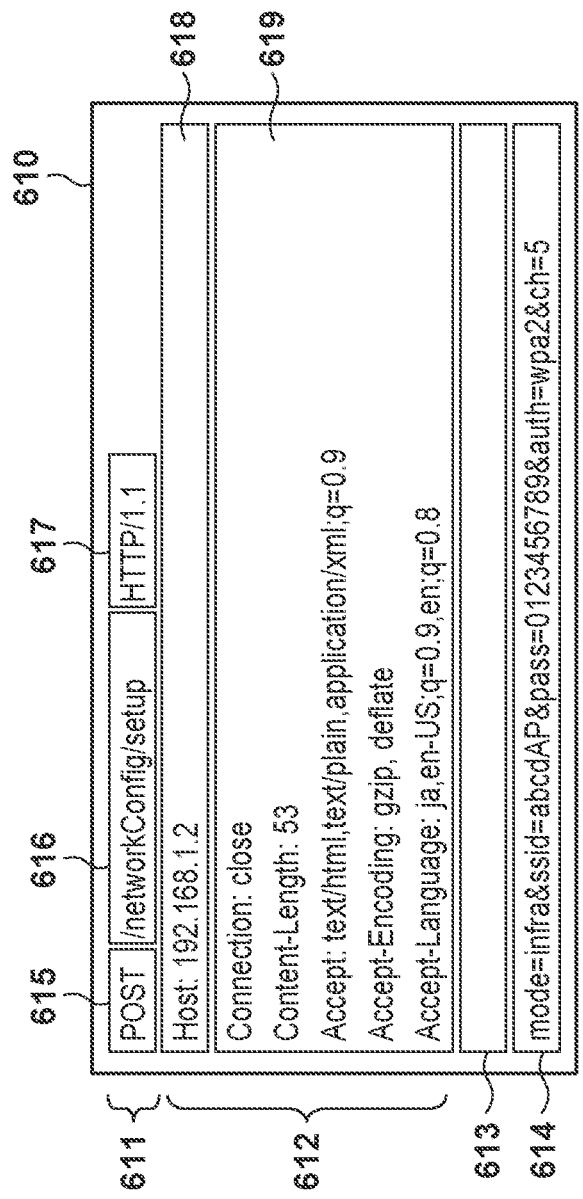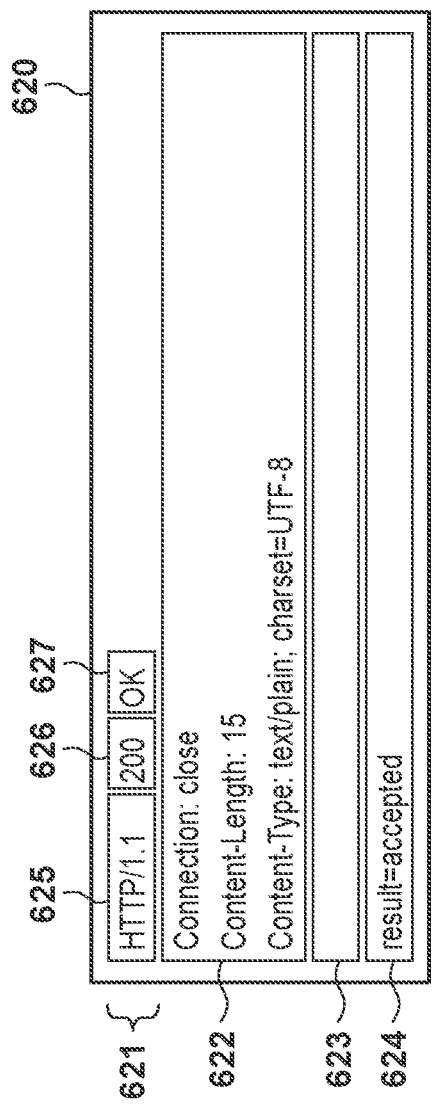
FIG. 6A
FIG. 6B

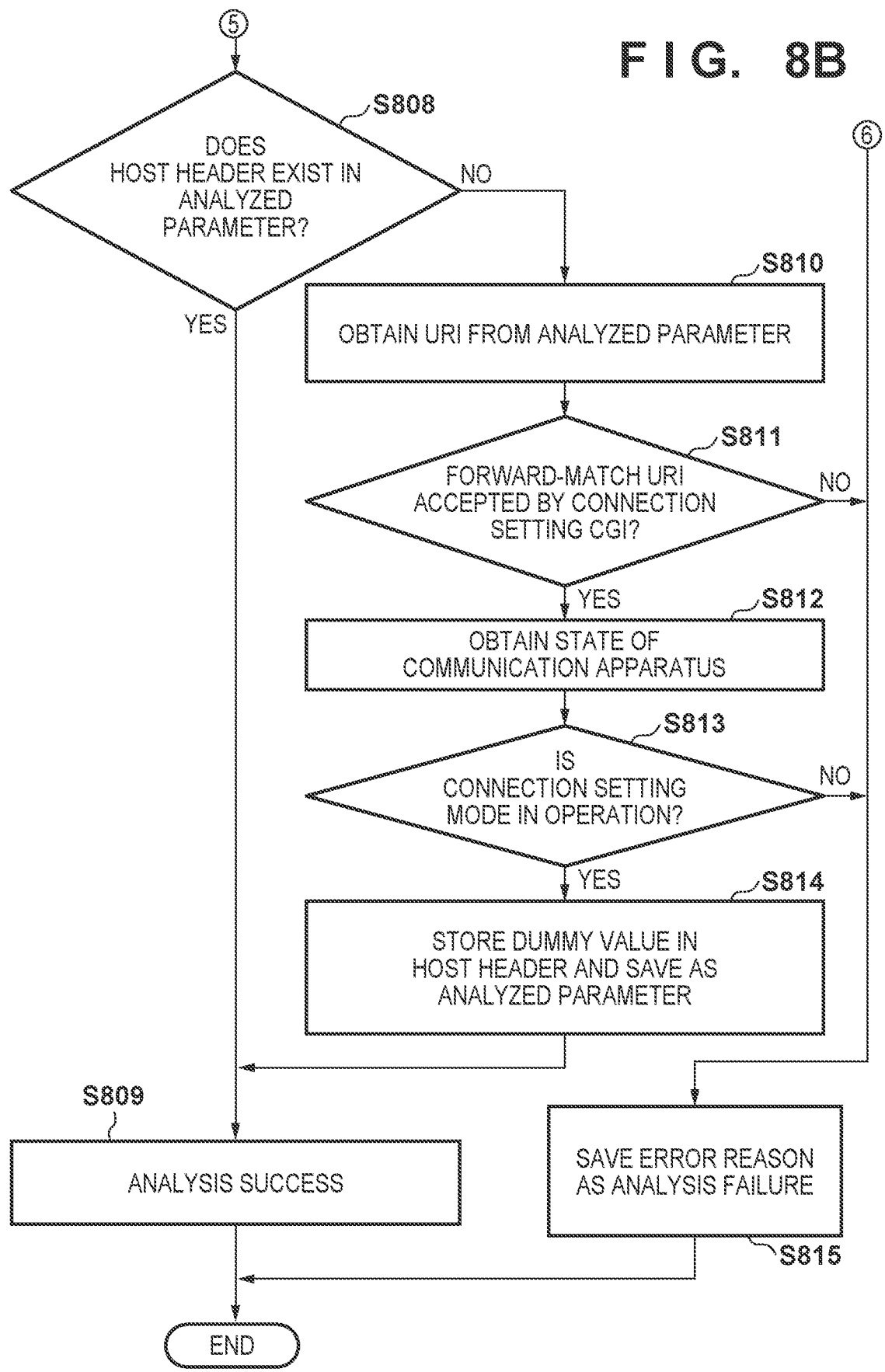

COMMUNICATION APPARATUS, METHOD, AND NON-TRANSITORY COMPUTER-READABLE STORAGE MEDIUM STORING PROGRAM

BACKGROUND OF THE INVENTION

Field of the Invention

The present invention relates to a communication apparatus, a method, and a non-transitory computer-readable storage medium storing a program.

Description of the Related Art

A communication apparatus generally provides its function to an external information processing apparatus via a network. For example, the Common Gateway Interface (CGI) is known as a technique of providing a function of a communication apparatus to an external information processing apparatus via a network. The CGI specifications are defined as RFC (Request For Comments) 3875. CGI is a technique based on Hypertext Transfer Protocol (HTTP) as defined by RFC 2616. In CGI, a communication apparatus operates as an HTTP server, and an external information processing apparatus operates as an HTTP client. The respective apparatuses perform HTTP-based communication protocol processing.

When providing a function of the communication apparatus to the external information processing apparatus via a network, the HTTP client generates an HTTP request corresponding to the requested function and transmits it to the HTTP server. The HTTP server analyzes the HTTP request received from the HTTP client, and relays processing to an application corresponding to the requested function. When there are a plurality of relay destination applications, the HTTP server determines, using a parameter such as a uniform resource identifier (URI) included in the HTTP request, to which application the processing should be relayed. The relay destination application executes the processing corresponding to the HTTP request. The HTTP server generates an HTTP response in accordance with the execution result of the application, and transmits it to the HTTP client.

SUMMARY OF THE INVENTION

The present invention provides a communication apparatus for, when a function execution request received from an external apparatus does not comply with a communication protocol, properly processing the execution request, a method, and a non-transitory computer-readable storage medium storing a program.

The present invention in one aspect provides a communication apparatus capable of communicating with an information processing apparatus, comprising: a communication unit configured to perform communication between the communication apparatus and the information processing apparatus; an analysis unit configured to analyze an execution request of a function of the communication apparatus using a predetermined communication protocol that has been received from the information processing apparatus via the communication unit; and an execution unit configured to, when the execution request of the function does not comply with a specification of the predetermined communication protocol as a result of the analysis by the analysis unit, transmit a response using the predetermined communication protocol on condition that at least the execution request of the function is an execution request of a specific function, and execute the specific function.

According to the present invention, when a function execution request received from an external apparatus does not comply with a communication protocol, the execution request can be properly processed.

Further features of the present invention will become apparent from the following description of exemplary embodiments with reference to the attached drawings.

BRIEF DESCRIPTION OF THE DRAWINGS

FIG. 3 is a block diagram showing the arrangement of the communication apparatus;

FIGS. 6A and 6B are views showing HTTP communication data;

FIGS. 8A and 8B are flowcharts showing analysis processing.

DESCRIPTION OF THE EMBODIMENTS

Figure 1A:
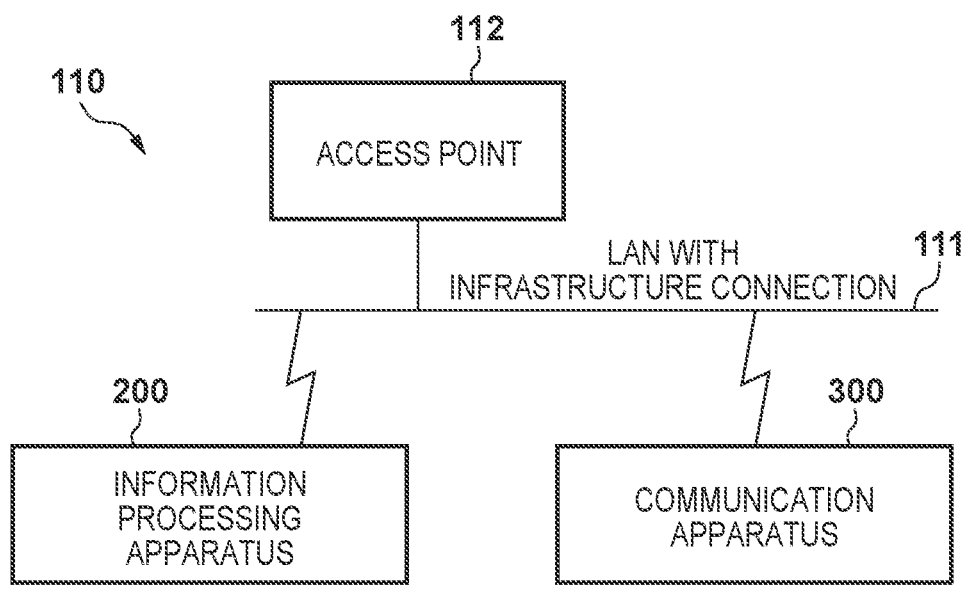
FIGS. 1A and 1B are block diagrams showing the configuration of a communication system.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

It is described in Japanese Patent Laid-Open No. 1-286652 that protocol processing is constituted by two stages of a basic protocol processing unit and intelligent protocol processing unit so as to cope with upgrade of the protocol and the like, and the intelligent protocol processing unit performs processing corresponding to the upgrade of the protocol.

In a configuration in which a communication apparatus provides a plurality of application functions to an external information processing apparatus on a communication protocol, the external information processing apparatus requests execution of the application of the communication apparatus. When the request operation does not comply with the protocol specifications, it is sometimes improper to process the request operation as an error unconditionally. However, it is undesirable in terms of security to unconditionally permit the request operation not compliant with the protocol specifications.

According to the present disclosure, when a function execution request received from an external apparatus does not comply with a communication protocol, the execution request can be properly processed.

An information processing apparatus and communication apparatus included in a communication system according to an embodiment will be described. In the embodiment, a smartphone capable of wireless communication with the communication apparatus will be exemplified as the information processing apparatus, but the information processing apparatus is not limited to this. The information processing apparatus suffices to be an apparatus capable of wired or wireless communication with the communication apparatus, and may be a portable terminal, a notebook PC, a tablet terminal, a PDA (Personal Digital Assistant), a digital camera, or the like. A printer (printing apparatus) will be exemplified as the communication apparatus, but the communication apparatus is not limited to this. The communication apparatus suffices to be an apparatus capable of wired or wireless communication with the information processing apparatus. For example, in the case of a printer, it may be an inkjet printer, a full-color laser beam printer, a monochrome printer, or the like. The communication apparatus is not limited to the printer, and may be a copying machine, a facsimile apparatus, a portable terminal, a smartphone, a notebook PC, a tablet terminal, a PDA, a digital camera, a music player, a television, or the like. The communication apparatus may be a multi-function peripheral having a plurality of functions such as a copy function, FAX function, and print function.

First, the network configuration of the communication system according to the embodiment will be described with reference to FIGS. 1A and 1B. Note that the following network configuration is merely an example, and is not limited to the configuration shown in FIGS. 1A and 1B as long as the information processing apparatus and the communication apparatus are capable of wired or wireless communication.

A network configuration 110 shown in FIG. 1A includes a local area network (LAN) 111 in an infrastructure mode. In an infrastructure connection defined by the IEEE 802.11 standards, devices communicate via a network built by an access point set outside the devices that communicate. For example, an information processing apparatus 200 and a communication apparatus 300 connect to a network built by an access point 112, and communicate with each other via the access point 112. For a connection in the infrastructure mode, each device searches for an access point by a device search command. When an access point is detected, wireless connection processing (for example, establishment of a wireless connection) is performed between the device and the access point, and then IP connection processing (for example, assignment of an IP address) is performed. Note that commands and parameters transmitted/received when implementing a wireless connection between the device and the access point are, for example, those defined in the IEEE 802.11 (Wi-Fi) standard.

In the embodiment, when the communication apparatus 300 operates in the infrastructure mode, the access point 112 operates as a master station and the communication apparatus 300 operates as a slave station. Then, the communication apparatus 300 and the information processing apparatus 200 can communicate via the access point 112. Note that a channel used for communication in the infrastructure mode may be a channel in the 2.4 GHz band, or a frequency band other than the 2.4 GHz band such as a channel in the 5.0 GHz band or a channel in the 6.0 GHz band. To communicate with the communication apparatus 300 via the access point 112, the information processing apparatus 200 needs to recognize that the communication apparatus 300 belongs to a network formed by the access point 112 to which the information processing apparatus 200 belongs. In the embodiment, a state in which the information processing apparatus 200 and the communication apparatus 300 simply connect to the same access point is regarded as a connection state in the infrastructure mode. That is, in the connection state in the infrastructure mode, the information processing apparatus 200 and the communication apparatus 300 suffice to connect to the same access point, and need not recognize that the partner apparatus belongs to the network to which the apparatus itself belongs.

Figure 1B:
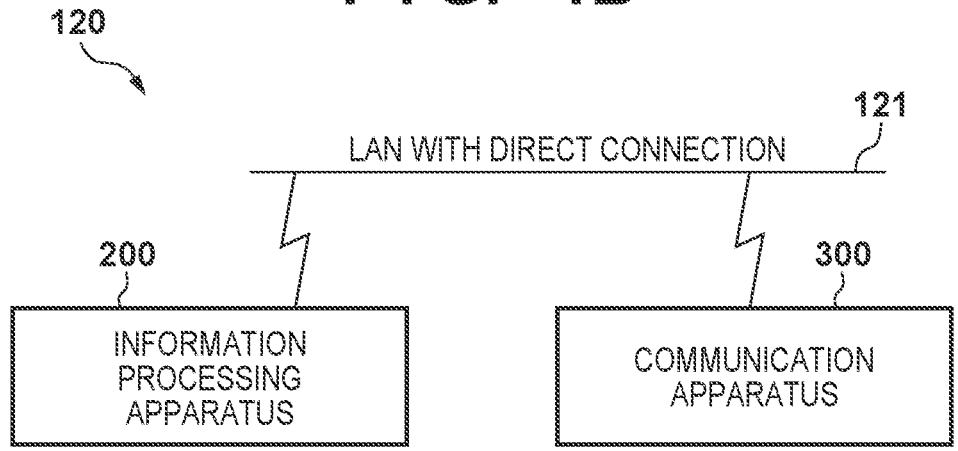

A network configuration 120 shown in FIG. 1B includes a LAN 121 in a direct mode. In a connection in the direct mode, devices directly connect to each other wirelessly without the intervention of an external apparatus such as the external access point 112. In Wi-Fi communication, a plurality of modes such as a soft AP mode and a Wi-Fi Direct (WFD) mode exist for a P2P direct connection. A mode in which a direct connection is executed by WFD is called a WFD mode. WFD is a standard formulated by Wi-Fi Alliance.

In the WFD mode, a device searches for a partner device serving as a communication partner by a device search command, and then decides the roles of a P2P group owner and P2P client. After deciding the roles, the device performs wireless connection processing. The role decision corresponds to, for example, GO Negotiation in P2P. More specifically, out of partner devices that communicate with each other, one device issues a device search command to search for the other device serving as a connection partner in the WFD mode. After the other device serving as the communication partner is detected, the two devices confirm information about suppliable services and functions. Note that this device supply information confirmation is not indispensable but optional. The device supply information confirmation phase corresponds to, for example, Provision Discovery in P2P. Then, the devices respectively confirm the device supply information, and decide which device serves as a P2P client and which device serves as a P2P group owner. After the client and the group owner are decided, the devices exchange parameters for performing WFD communication. Based on the exchanged parameters, subsequent wireless connection processing and IP connection processing are performed between the P2P client and the P2P group owner.

In the soft AP mode, out of devices that communicate with each other, for example, out of the information processing apparatus 200 and the communication apparatus 300, for example, the information processing apparatus 200 serves as a client playing a role of requesting various services. The other device implements the function of an access point in Wi-Fi by software setting. In the soft AP mode, the client searches by a device search command for a device serving as a soft AP. When the soft AP is detected, IP connection processing (for example, assignment of an IP address) is performed between the client and the soft AP through subsequent wireless connection processing (for example, establishment of wireless connection). Note that commands and parameters transmitted/received when implementing a wireless connection between the client and the soft AP are, for example, those defined in the IEEE 802.11 (Wi-Fi) standard. In the embodiment, when the communication apparatus 300 operates in direct connection, it operates as a master station in a network to which the communication apparatus 300 belongs. Note that the master station is an apparatus that builds a wireless network, and provides a slave station with parameters used to connect to a wireless network. The parameters used to connect to a wireless network are, for example, parameters regarding a communication channel used by the master station. The slave station receives the parameters and connects to the wireless network built by the master station by using the communication channel used by the master station. In the direct mode, the communication apparatus 300 operates as the master station and thus can decide which communication channel is used for communication in the direct mode. Connection information (SSID and password) for connecting to the communication apparatus 300 in the direct mode may be arbitrarily changed by, for example, a user operation to the operation unit of the communication apparatus 300.

In the embodiment, the communication apparatus 300 can parallelly establish the LAN 111 by infrastructure connection and the LAN 121 by direct connection. In other words, the communication apparatus 300 can parallelly establish a Wi-Fi connection in which the communication apparatus 300 serves as a slave station, and a Wi-Fi connection in which the communication apparatus 300 serves as a master station. This state in which the communication apparatus 300 operates while parallelly establishing the above-described two connections will be called a simultaneous operation.

In the embodiment, the information processing apparatus 200 performs, to the communication apparatus 300, setting (connection setting processing) for operating the communication apparatus 300 in at least one communication method out of the infrastructure connection and the direct connection. The connection setting processing in the embodiment is executed by wireless communication between the information processing apparatus 200 and the communication apparatus 300, and is also called cableless setup. The connection setting processing may be executed by wired communication. The communication apparatus 300 executes the connection setting processing in a state (connection setting state) in which the communication apparatus 300 operates in a connection setting mode serving as a setup mode for executing connection setting processing. The connection setting mode will be described later.

When operating the communication apparatus 300 in the infrastructure mode, the information processing apparatus 200 transmits, to the communication apparatus 300 by wireless communication, infrastructure connection setting information for operating the communication apparatus 300 in the infrastructure mode. The infrastructure connection setting information includes information about the access point 112 necessary to connect to the access point 112. The information about the access point 112 includes, for example, an SSID (Service Set IDentifier), a password, and a frequency band. The communication apparatus 300 can connect to the access point 112 by using the information about the access point obtained from the information processing apparatus 200.

To the contrary, when operating the communication apparatus 300 in the direct mode, the information processing apparatus 200 transmits direct connection setting information to the communication apparatus 300 by wireless communication. The direct connection setting information includes an instruction to enable the WFD function and operate the communication apparatus 300 as a group owner, or an instruction to enable access point setting of the communication apparatus 300. The information processing apparatus 200 obtains, from the communication apparatus 300, connection information necessary for a direct connection between the information processing apparatus 200 and the communication apparatus 300. The connection information for a direct connection to the communication apparatus 300 includes, for example, information such as the SSID and password of the communication apparatus 300. The information processing apparatus 200 can perform a direct connection to the communication apparatus 300 by connecting to a network built by the communication apparatus 300 using the connection information obtained from the communication apparatus 300.

In the embodiment, a temporal direct connection (direct connection dedicated to the connection setting mode) for connection setting between the information processing apparatus 200 and the communication apparatus 300 is used when transmitting infrastructure connection setting information or direct connection setting information and when obtaining connection information to perform a direct connection to the communication apparatus 300 in connection setting processing. In the embodiment, as the temporal direct connection for connection setting, connection setting processing using Wi-Fi is executed. However, for example, a wireless communication standard such as Bluetooth other than Wi-Fi may be used, or a wired communication standard such as a wired LAN or USB may be used.

After a connection in the infrastructure mode by Wi-Fi or a connection in the direct mode is established between the information processing apparatus 200 and the communication apparatus 300 by connection setting processing, the information processing apparatus 200 and the communication apparatus 300 can communicate via the established connection. More specifically, for example, the information processing apparatus 200 can transmit, to the communication apparatus 300 via the established connection, a print job for causing the communication apparatus 300 to print, or a scan job for causing the communication apparatus 300 to scan.

As described above, the communication apparatus 300 can operate in the connection setting mode. A trigger to cause the communication apparatus 300 to start an operation in the connection setting mode is, for example, pressing of a connection setting mode button by a user, or activation (power ON) of the communication apparatus 300.

After starting an operation in the connection setting mode, the communication apparatus 300 enables Wi-Fi communication. More specifically, the communication apparatus 300 operates as a soft AP mode dedicated to the connection setting mode. Then, the communication apparatus 300 can establish a direct connection by Wi-Fi to the information processing apparatus 200. Connection information for connecting to the communication apparatus 300 is held in advance in a setup program installed in the information processing apparatus 200, and the information processing apparatus 200 recognizes in advance the connection information for connecting to the soft AP mode dedicated to the connection setting mode. Hence, the user cannot arbitrarily change the connection information for connecting to the soft AP mode dedicated to the connection setting mode, unlike connection information of an access point enabled in direct connection. In the connection setting mode, the communication apparatus 300 may connect to the information processing apparatus 200 not by the soft AP mode but by WFD. That is, the communication apparatus 300 may operate as a group owner at the time of a direct connection dedicated to the connection setting mode, and receive setting information from the information processing apparatus 200 by a direct connection dedicated to the connection setting mode by WFD.

Figure 2:
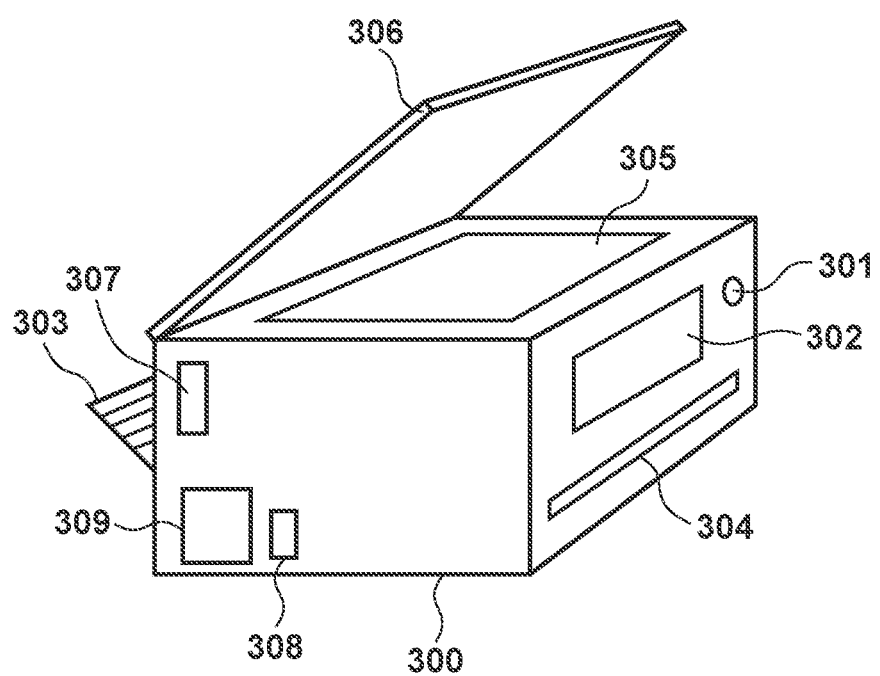
FIG. 2 is a view showing the outer appearance of a communication apparatus.

FIG. 2 is a view showing the outer appearance of the communication apparatus 300. In the embodiment, a multi-function printer (MFP) having the print function, scan function, and other functions will be explained as an example of the communication apparatus 300. A power button 301 is a hard key used for power ON and OFF operations by the user. An operation panel 302 includes a display and button used to operate the communication apparatus 300 by the user. A print sheet insertion port 303 is an insertion port capable of setting sheets of a plurality of sizes. Sheets set at the print sheet insertion port 303 are conveyed one by one to a printing unit, undergo printing, and are discharged from a print sheet discharge port 304. A document table 305 is a transparent glass table and is used to set a document and scan it by a scanner. A document table press plate 306 is a cover for pressing a document against the document table so as not to float when scanning it by the scanner, and for preventing external light from entering the scanner unit. A wireless LAN communication unit 307 includes circuits such as an antenna buried to implement wireless communication such as the above-described infrastructure connection and direct connection. A USB communication unit 308 includes circuits and a USB connector for performing communication by USB connection between the communication apparatus 300 and the external information processing apparatus 200 or the like. A power supply unit 309 includes a power supply circuit and power jack for supplying power to the communication apparatus 300.

FIG. 3 is a block diagram showing an example of the arrangement of the communication apparatus 300. The communication apparatus 300 includes a main board 310 that controls the overall apparatus, the power button 301, the operation panel 302, the wireless LAN communication unit 307, and the USB communication unit 308. Respective blocks inside the main board 310 are connected to each other via an interval bus 312. A CPU 311 in the form of a microprocessor arranged on the main board 310 operates in accordance with control programs stored in a program memory 313 in the form of a ROM, and data stored in a data memory 314 in the form of a RAM. The CPU 311 controls a scanning unit 317 to scan a document, and stores the scanning result in an image memory 315 inside the data memory 314. The CPU 311 controls a printing unit 316 to print on a printing medium based on image data in the image memory 315 inside the data memory 314. The CPU 311 controls the wireless LAN communication unit 307 via a wireless LAN communication control unit 318 to perform wireless LAN communication with the information processing apparatus 200 by direct connection or infrastructure connection. The CPU 311 controls the USB communication unit 308 via a USB communication control unit 320 to perform USB communication with the information processing apparatus 200 by USB connection. The CPU 311 controls an operation control unit 319 to accept operation information from the power button 301 and the operation panel 302. The CPU 311 controls the operation control unit 319 to display the state of the communication apparatus 300 and a function selection menu on the operation panel 302.

Figure 4A:
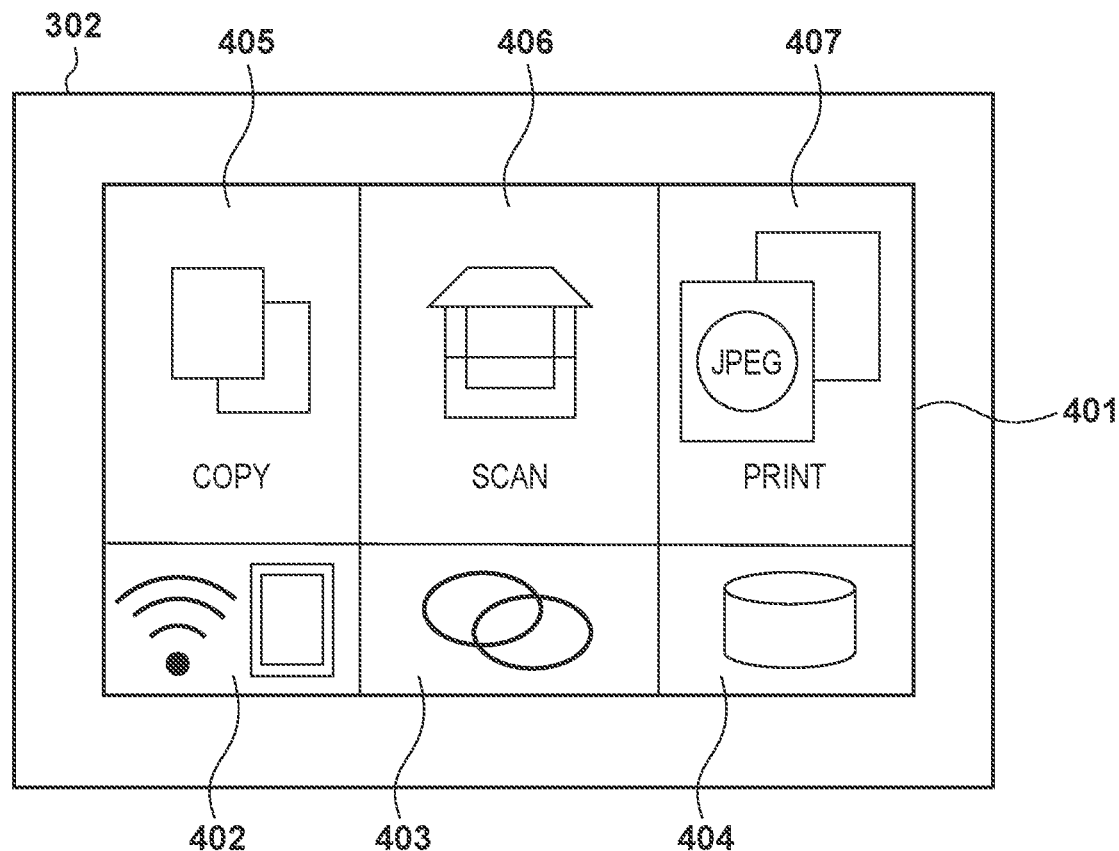
FIGS. 4A and 4B are views showing the arrangement of the operation panel of the communication apparatus.
Figure 4B:
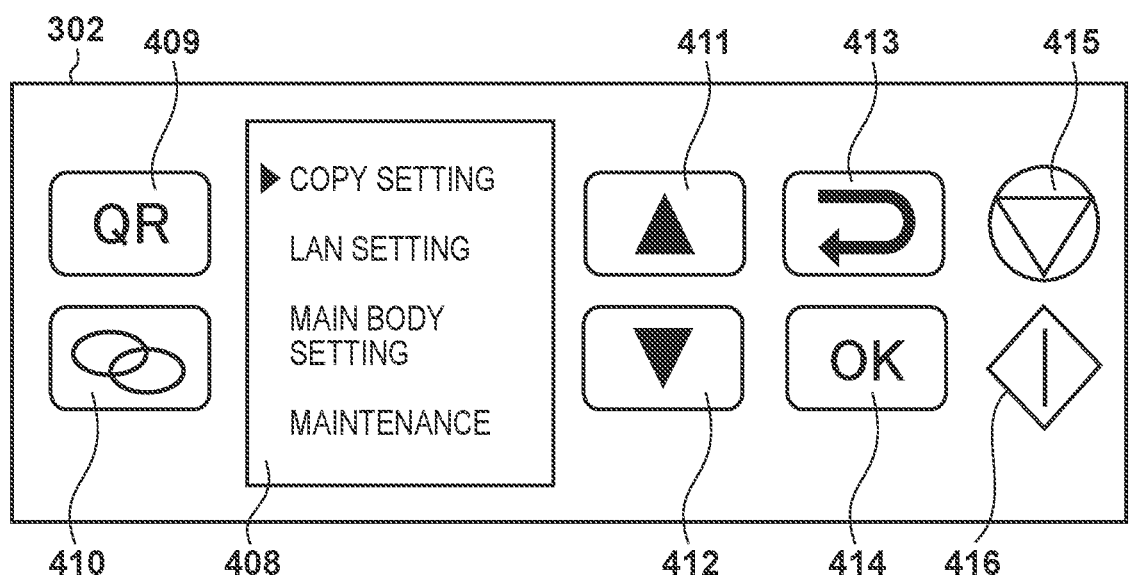

FIGS. 4A and 4B are views schematically showing an example of the operation panel 302 of the communication apparatus 300. FIG. 4A shows an example when a touch panel display 401 is used as the operation panel 302. When the user presses the power button 301, the communication apparatus 300 is turned on. After the communication apparatus 300 is ON, the touch panel display 401 displays a home screen serving as the top layer of a menu operable by the user. The home screen displays a copy area 405 for accepting a copy processing execution instruction, a scan area 406 for accepting a scan processing execution instruction, and a print area 407 for accepting a print processing execution instruction. The home screen also displays a state display area 402 representing setting of infrastructure connection and direct connection of the communication apparatus 300, and a connection state, a connection setting mode area 403 for allowing the user to start an operation in the connection setting mode at an arbitrary timing, and a setting area 404 for changing various settings.

FIG. 4B shows an example when a relatively compact LCD display 408 and various hard keys 409 to 416 are used as the operation panel 302. When the user presses the power button 301, the communication apparatus 300 is turned on. After the communication apparatus 300 is ON, the LCD display 408 displays a home screen serving as the top layer of a menu operable by the user. The user can touch the cursor move buttons 411 and 412 to operate a cursor displayed on the LCD display 408. The user touches the OK button 414 to execute an operation, and touches the return button 413 to display an immediately preceding menu screen. The user touches the QR button 409 to display a QR Code® including information necessary for direct connection to the communication apparatus 300. When the QR code is read by the camera of the information processing apparatus 200 or the like, the information processing apparatus 200 and the communication apparatus 300 can wirelessly communicate with each other by direct connection between them. The user can touch the connection setting button 410 to start the connection setting mode, and the information processing apparatus 200 can transmit connection information to the communication apparatus 300 to connect the communication apparatus 300 to the access point 112. The stop button 415 is used to cancel various processes while the communication apparatus 300 executes these processes. The copy start button 416 is used to accept instructions to start execution of scanning and printing of a document by the communication apparatus 300.

Figure 5:
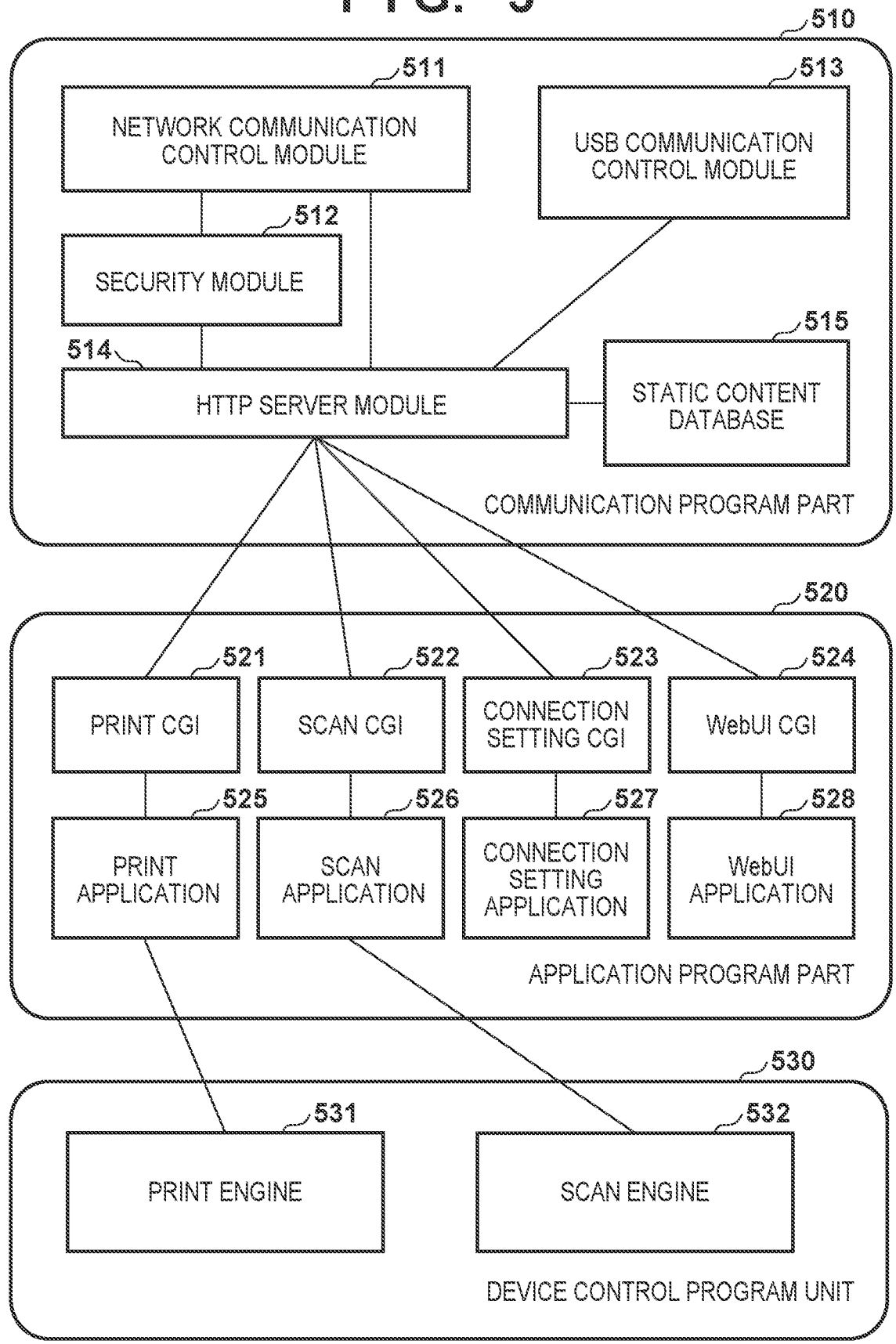
FIG. 5 is a block diagram showing the structure of programs of a communication apparatus 300.

FIG. 5 is a block diagram schematically showing an example of the structure of programs running when the communication apparatus 300 operates as an HTTP server and provides an application function to the information processing apparatus 200. The elements and structure of programs shown in FIG. 5 are merely an example, and the structure is not limited to that in FIG. 5. The programs shown in FIG. 5 are at least some of control programs stored in the program memory 313 operating by the CPU 311, and accessory data stored in the data memory 314. The programs shown in FIG. 5 include a communication program part 510 that mainly controls communication, an application program part 520 that mainly controls an application function, and a device control program part 530 that mainly controls printing and scanning.

The communication program part 510 includes a network communication control module 511, a security module 512, a USB communication control module 513, an HTTP server module 514, and a static content database 515. The network communication control module 511 is a module that controls the wireless LAN communication control unit 318 and takes charge of up to the transport layer of a communication protocol stack, and implements TCP/IP communication of the communication apparatus 300. The security module 512 is a module that takes charge of encryption and decryption of communication, accompanying authentication, and processing of a hash and the like, and implements TLS/SSL communication of the communication apparatus 300. The USB communication control module 513 is a module that controls the USB communication control unit 320 and takes charge of processing for operating as a USB device, and implements USB communication of the communication apparatus 300. The HTTP server module 514 is a module that takes charge of processing for operating the communication apparatus 300 as an HTTP server, and implements HTTP communication with the external information processing apparatus 200 operating as an HTTP client. The operation of the HTTP server module 514 will be described with reference to FIGS. 7 and 8. The static content database 515 is a module operating as a file system, and implements readout and write of JPEG data, HTML, data, and the like stored in the data memory 314.

The application program part 520 includes application programs 525 to 528 and accessory CGI programs 521 to 524. The CGI programs 521 to 524 accept CGI search from the HTTP server module 514, and determine, based on a parameter such as a URI, whether the CGI search is an HTTP request that should be processed by the CGI programs 521 to 524. If the CGI programs 521 to 524 determine that the CGI search is an HTTP request that should be processed by the CGI programs 521 to 524, they accept CGI execution from the HTTP server module 514, receive the body of the HTTP request, and extract necessary data from analyzed parameters. Then, the CGI programs 521 to 524 execute the functions of the application programs 525 to 528 based on the accepted HTTP request, and perform generation of an HTTP response or the like in accordance with the execution result.

The print application 525 is a module that receives a request from the print CGI program 521 and implements print processing. For example, print settings and print data are stored in a predetermined format in the body of an HTTP request received by the print CGI program 521. Upon receiving the print settings and print data, the print application 525 controls a print engine 531 to execute printing. The print application 525 notifies the print CGI program 521 of capability/incapability of execution of printing, error information, and the like.

The scan application 526 is a module that receives a request from the scan CGI program 522 and implements scan processing. For example, scan settings are stored in a predetermined format in the body of an HTTP request received by the scan CGI program 522. Upon receiving the scan settings, the scan application 526 controls a scan engine 532 to execute scanning. The scan application 526 notifies the scan CGI program 522 of capability/incapability of execution of scanning, error information, scanned image data, and the like.

The connection setting application 527 is a module that receives a request from the connection setting CGI program 523 and executes specific connection setting processing. For example, connection settings are stored in a predetermined format in the body of an HTTP request received by the connection setting CGI program 523. The connection settings are, for example, information about the access point 112, and information about the SSID, password, and frequency band. Upon receiving the connection settings, the connection setting application 527 controls the wireless LAN communication control unit 318 to execute connection settings. The connection setting application 527 notifies the connection setting CGI program 523 of capability/incapability of execution of connection settings, error information, and the like. Note that there are a plurality of methods for connection setting processing. The connection setting application 527 is a module for specific connection setting processing, and an application (not shown) serving as a module for connection setting processing of another method is provided separately.

The Web UI application 528 is a module that receives a request from the Web UI CGI program 524 and implements display and operation of a Web UI. For example, data extracted from analyzed parameters of an HTTP request by the Web UI CGI program 524 include information of a Web UI to be displayed, language setting, and the like. For example, when the request is to display the state of the communication apparatus 300, the remaining ink amount of the printing unit 316, and the like on the Web UI, the Web UI application 528 collects necessary data from another module and the data memory 314, and performs data shaping. Then, the Web UI application 528 notifies the Web UI CGI program 524 of capability/incapability of the display request, error information, collected/shaped data, and the like.

The device control program part 530 includes the print engine 531 and the scan engine 532. The print engine 531 is a module that controls the printing unit 316 and implements print processing based on print data, print settings, and print control information received from the print application 525 and the like. The scan engine 532 is a module that controls the scanning unit 317 and implements scan processing based on scan settings and scan control information received from the scan application 526 and the like.

FIGS. 6A and 6B are views showing an example of HTTP communication data transmitted/received between the information processing apparatus 200 and the communication apparatus 300. Here, the information processing apparatus 200 operates as an HTTP client, and the communication apparatus 300 operates as an HTTP server.

FIG. 6A shows an example of an HTTP request 610 transmitted from the information processing apparatus 200 to the communication apparatus 300. The HTTP request 610 is one form of a request that is generated by a WEB browser or application running on the information processing apparatus 200 and transmitted to execute a function of the communication apparatus 300. The HTTP request 610 is constituted by character strings of a plurality of lines. The HTTP request 610 includes at least a request line 611, a header field 612, and an empty line 613. The HTTP request 610 sometimes includes a body 614.

The request line 611 includes an HTTP method 615, a URI (Uniform Resource Identifier) 616, and an HTTP version 617. Types such as "GET", "POST", and "HEAD" exist for the HTTP method 615, and represent rough control types in HTTP. The URI 616 represents the target of a request, and includes path information, a file name, and the like that specify the target of the request. The HTTP version 617 is version information of HTTP, and represents a correspondence between the request and an operation complying with a version of HTTP.

The header field 612 is constituted by a plurality of header lines, and especially a Host header 618 is a single indispensable header in HTTP/1.1. Other headers 619 are options, and the presence/absence of them changes depending on a request. The empty line 613 represents that the header field 612 ends by a line immediately before the empty line 613. The body 614 exists when, for example, a Content-Length header is included in the header field 612, and represents a payload in the HTTP request 610.

FIG. 6B shows an example of an HTTP response 620 transmitted from the communication apparatus 300 to the information processing apparatus 200 as a response to the HTTP request 610 shown in FIG. 6A. The HTTP response 620 is constituted by character strings of a plurality of lines. The HTTP response 620 includes at least a status line 621, a header field 622, and an empty line 623. The HTTP response 620 sometimes includes a body 624.

The status line 621 includes an HTTP version 625, a status code 626, and a text phrase 627. The HTTP version 625 is version information of HTTP, and represents the result of an operation complying with a version of HTTP. The status code 626 is a number representing the processing result of the HTTP request 610 corresponding to the HTTP response 620. The text phrase 627 is a message that complements the meaning of the status code 626.

The header field 622 is constituted by a plurality of header lines. Note that there is no definition of an indispensable header in HTTP/1.1 for the header field 622 included in the HTTP response 620. The empty line 623 represents that the header field 622 ends by a line immediately before the empty line 623. The body 624 exists when, for example, a Content-Length header is included in the header field 622, and represents a payload in the HTTP response 620.

A pair of the HTTP request 610 and the HTTP response 620 shown in FIGS. 6A and 6B shows an example in a case where infrastructure connection setting information is transmitted when the information processing apparatus 200 performs connection setting processing of the communication apparatus 300. In the HTTP request 610, a character string having a prefix "/networkConfig/" representing a request that should be processed by the connection setting CGI program 523 is designated as the URI 616. The body 614 includes an SSID and password serving as information about the access point 112, information about the frequency band, and the like. In the HTTP response 620, "200 OK" representing that the execution result of the HTTP request 610 is successful is set in the status code 626 and the text phrase 627. Also, the body 624 includes "result=accepted" representing that the connection setting application 527 has accepted connection setting processing.

Figure 7A:
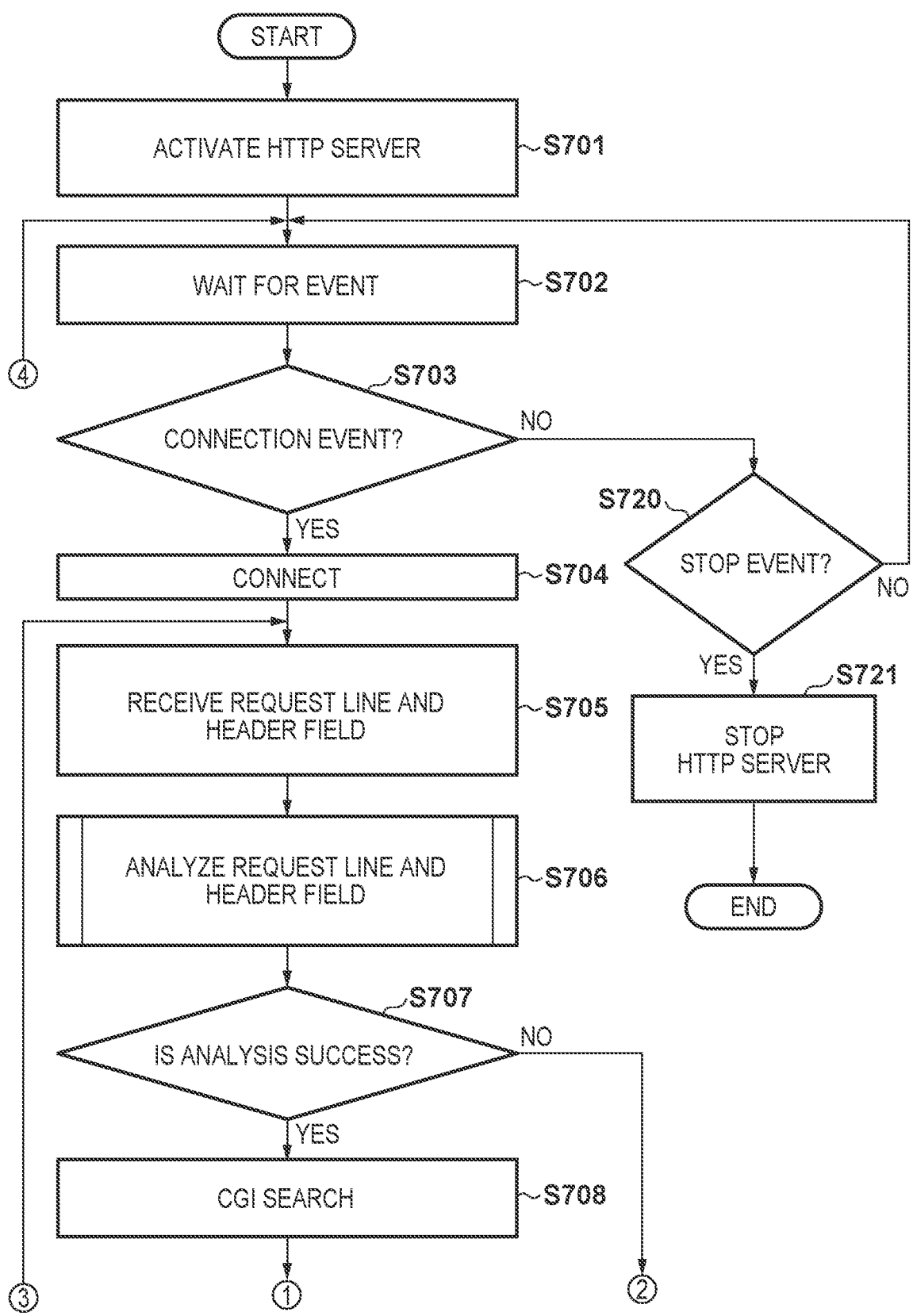
FIGS. 7A and 7B are flowcharts showing processing of an HTTP server module.
Figure 7B:
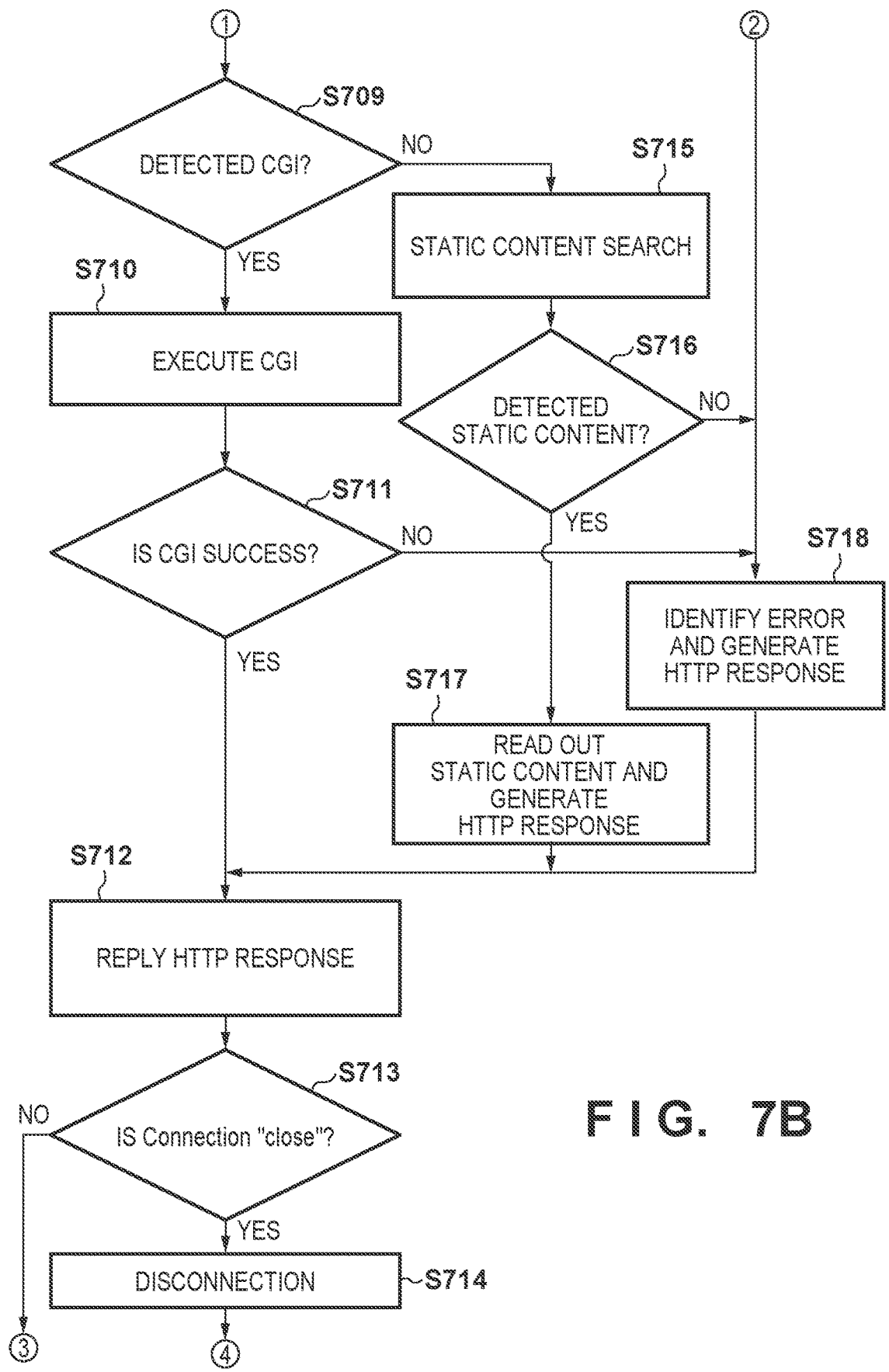

FIGS. 7A and 7B are flowcharts showing processing of the HTTP server module 514 of the communication apparatus 300. The processing in FIGS. 7A and 7B starts in response to connection of the communication apparatus 300 to an IP network, for example, determination of an IP address of the communication apparatus 300 on an IP network built by enabling the access point function of the communication apparatus 300 for direct connection dedicated to the connection setting mode.

In step S701, activation processing of the HTTP server is performed. For example, initialization processing of an area used by the HTTP server module 514 out of the data memory 314, and connection wait processing are performed in the activation processing of the HTTP server. The HTTP server module 514 may wait for a connection on a plurality of communication paths such as a TCP80 port and a TCP443 port using the network communication control module 511. For example, an HTTP request by plain text communication is waited for at the TCP80 port, and an HTTP request by cipher communication is waited for at the TCP443 port. An HTTP request may be waited for by not only TCP communication, but also USB communication using the USB communication control module 513.

In step S702, a connection event designating a connection or the start of communication, or a stop event designating the stop of the HTTP server is waited for. In step S703, the HTTP server module 514 determines whether a connection event has occurred. For example, when a connection from the external information processing apparatus 200 is detected at the TCP443 port, the HTTP server module 514 determines that a connection event has occurred. If it is determined that a connection event has occurred, connection processing is performed in step S704. In the connection processing, for example, for cipher communication, TLS/SSL handshake is performed using the security module 512. As a result, subsequent communication is encrypted in this session, ensuring security between the information processing apparatus 200 and the communication apparatus 300.

In step S705, a request line and a header field are received. As described in FIG. 6A, the end of the header field can be detected by the empty line 613 in the HTTP request 610, so the reception continues until the empty line 613 is detected.

In step S706, the request line and the header field are analyzed. Details of step S706 will be described with reference to FIGS. 8A and 8B. In step S707, the HTTP server module 514 determines based on the result of analysis in step S706 whether the analysis has succeeded or failed. If no error has been generated in step S706, it is determined that the analysis has succeeded, and the process advances from step S707 to step S708. If an error has been generated in step S706, it is determined that the analysis has failed, and the process advances from step S707 to step S718.

In step S708, CGI search is performed. In the CGI search, the HTTP server module 514 sequentially transfers analyzed parameters to the CGI programs 521 to 524, and causes them to send back as responses the results of determining whether any one of the CGI programs 521 to 524 should process the HTTP request. This determination is performed by, for example, checking whether URI information (character string) transferred as one of analyzed parameters forward-matches a character string held as a URI that should be processed by the CGI program. In step S709, the HTTP server module 514 determines whether any one of the CGI programs 521 to 524 has replied that the CGI program itself should process the HTTP request. If any one of the CGI programs has replied that the CGI program itself should process the HTTP request, the process advances from step S709 to step S710.

In step S710, the HTTP server module 514 requests CGI execution of the CGI program that has replied in step S708 that the CGI program itself should process the HTTP request. The CGI execution-requested CGI program receives the body of the HTTP request, extracts necessary data from the analyzed parameters, and executes the requested function in cooperation with the application programs 525 to 528. For example, for an HTTP request that should be processed by the connection setting CGI program 523, the connection setting CGI program 523 executes specific connection setting processing. The CGI program performs generation of an HTTP response or the like in accordance with the execution result, and sends back the CGI execution result to the HTTP server module 514. In step S711, the HTTP server module 514 determines whether the received CGI execution result represents a success or a failure. If the HTTP server module 514 determines that the received CGI execution result represents a success, the process advances from step S711 to step S712. If the HTTP server module 514 determines that the received CGI execution result represents a failure, the process advances from step S711 to step S718.

In step S712, response processing of a generated HTTP response is performed. In step S712, the HTTP response is transmitted to the external information processing apparatus 200 that has transmitted the HTTP request. In step S713, the HTTP server module 514 determines whether the Connection header of the received HTTP response is "close" representing disconnection. If the HTTP server module 514 determines that the Connection header of the received HTTP response is "close" representing disconnection, the process advances from step S713 to step S714. If the HTTP server module 514 determines that the Connection header of the received HTTP response is "keep-alive" representing continuation of communication, the process returns from step S713 to step S705 to receive the next HTTP request. Note that, for example, a case in which no Connection header exists in the received HTTP response is regarded as setting of "close" representing disconnection, and the process advances from step S713 to step S714.

In step S714, disconnection processing is performed, the session ends, and then the process returns to step S702. For example, for the TCP443 port, TLS/SSL communication is disconnected using the security module 512, and TCP communication is disconnected using the network communication control module 511. The process returns to step S702 to wait for the next connection.

If it is determined in step S709 that all the CGI programs reply that none of them should process the HTTP request in CGI search in step S708, the process advances from step S709 to step S715 to perform static content search. This is because the CGI program is a program for dynamic content generation, and when all the CGI programs reply that none of them should process the HTTP request, the HTTP request is determined to be a request of a static content.

In static content search, the static content database 515 is inquired of based on the analyzed parameters such as a URI. In step S716, the HTTP server module 514 determines based on the inquiry result whether a static content corresponding to the HTTP request has been detected. If the HTTP server module 514 determines that a static content has been detected, the process advances from step S716 to step S717. If the HTTP server module 514 determines that no static content has been detected, the process advances from step S716 to step S718.

In step S717, the HTTP server module 514 reads out JPEG data or HTML data stored in the data memory 314 and generates an HTTP response, and the process advances to step S712.

If the process advances from step S707, S711, or S716 to step S718, the HTTP server module 514 performs error discrimination and generation of an HTTP response. In error discrimination, the HTTP status code 626 and the text phrase 627 are decided from the cause of the generated error. For example, when an error in which no Host header exists in step S706 is generated, "400 Bad Request" is decided as the HTTP status code 626 and the text phrase 627. An HTTP response is generated using the decided HTTP status code 626 and text phrase 627, and the process advances to step S712.

If it is determined in step S703 that no connection event has occurred, the HTTP server module 514 determines in step S720 whether a stop event designating the stop of the HTTP server has occurred. If the HTTP server module 514 determines that a stop event has occurred, the process advances from step S720 to step S721. The stop event occurs when the communication apparatus 300 is disconnected from the IP network. For example, the stop event occurs when the communication apparatus 300 is turned off with the power button 301. In step S721, the HTTP server module 514 performs stop processing of the HTTP server, and then the processing in FIGS. 7A and 7B ends. If the HTTP server module 514 determines in step S720 that no stop event has occurred, for example, if an event other than a connection event and a stop event has occurred, no processing is necessary, and the process returns from step S720 to step S702.

Figure 8A:
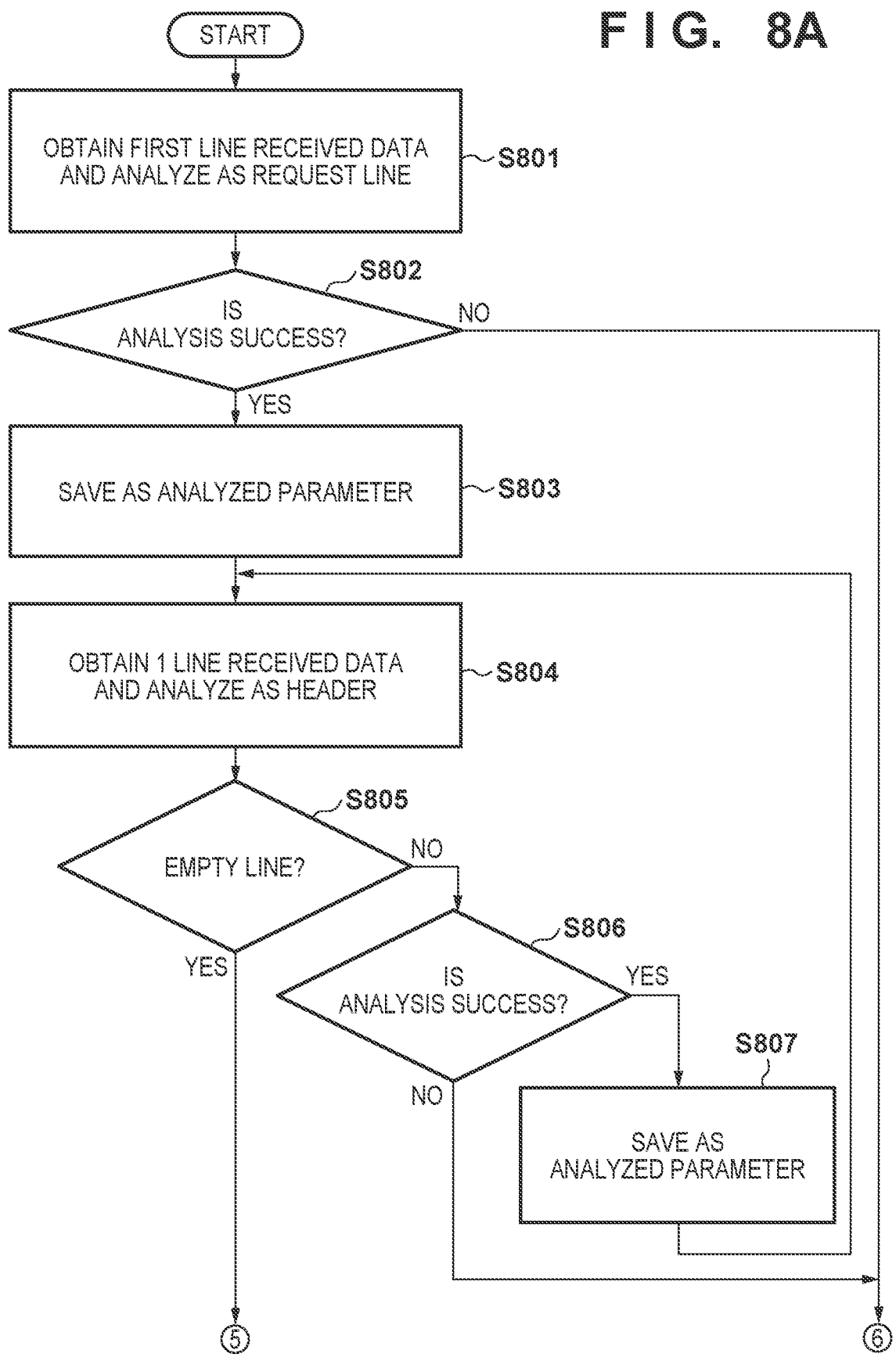

FIGS. 8A and 8B are flowcharts showing analysis processing of the request line and header field in step S706. In step S801, the HTTP server module 514 obtains the first line from received data, and analyzes it as the request line 611. In step S802, the HTTP server module 514 determines whether the result of analysis in step S801 represents a success or a failure. If the HTTP server module 514 determines that the result of analysis in step S801 represents a success, it saves the HTTP method 615, the URI 616, and the HTTP version 617 as analyzed parameters in step S803. If the HTTP server module 514 determines that the result of analysis in step S801 represents a failure, it saves information representing the analysis failure of the request line in step S815, and then the subprocess in FIGS. 8A and 8B ends because of the analysis failure of the HTTP request.

After step S803, in step S804, the HTTP server module 514 obtains the next line from the received data as an analysis target, and analyzes it as a header line serving as one line of the header field 612. The HTTP header is a grammar in which a header name and a header value are separated by a colon, and when the analysis is successful, a pair of a header name and a header value is obtained as header information. In step S805, the HTTP server module 514 determines whether a line serving as an analysis target is an empty line. If it is determined that a line serving as an analysis target is an empty line, the process advances to step S808. If it is determined that a line serving as an analysis target is not an empty line, the process advances to step S806, and the HTTP server module 514 determines whether the analysis result represents a success or a failure. If the HTTP server module 514 determines that the analysis result represents a success, it saves in step S807 a pair of the header name and the header value obtained in step S804 as analyzed parameters. If the HTTP server module 514 determines that the analysis result represents a failure, it saves in step S815 information representing the analysis failure of the header field, and then the subprocess in FIGS. 8A and 8B ends. After step S807, in step S804, the HTTP server module 514 obtains the next line from the received data as an analysis target, and analyzes it as a header line serving as one line of the header field 612.

In step S808, the HTTP server module 514 determines whether the Host header 618 exists in the saved analyzed parameters. For example, the HTTP server module 514 determines whether the Host header 618 exists, by checking whether the description of the header name of the analyzed parameter coincides with "Host" regardless of an upper or lower case. If the HTTP server module 514 determines that the Host header 618 exists, it determines in step S809 that the processing is successful, and the subprocess in FIGS. 8A and 8B ends. If the HTTP server module 514 determines that the Host header 618 does not exist, the process advances to step S810.

According to the specifications of the HTTP communication protocol, when it is determined that the Host header 618 does not exist, it is determined that an error in which no Host header exists has occurred, analysis processing ends, and "400 Bad Request" needs to be sent back as an HTTP response. However, some methods omit a Host header among methods of requesting connection setting processing by an HTTP request by the external information processing apparatus 200. In the embodiment, the absence of a Host header is not determined to be an error on condition that the HTTP request corresponds to predetermined processing (for example, specific connection setting processing) and the state of the communication apparatus 300 corresponds to the predetermined processing in accordance with information included in the request line 611. By this arrangement, even when the external information processing apparatus 200 is configured to omit a Host header at the time of requesting connection setting processing by an HTTP request, the processing is not regarded as error processing and can be properly performed without influencing another type of processing. Details of this will be described below.

In step S810, the HTTP server module 514 obtains a URI from the analyzed parameters. In step S811, the HTTP server module 514 determines whether the obtained URI forward-matches a URI that should be accepted by the connection setting CGI program 523. Here, whether the processing is specific connection setting processing is determined by forward-matching. That is, when the obtained URI forward-matches a URI that should be accepted by the connection setting CGI program 523, the HTTP request is determined to be an HTTP request of specific connection setting processing. To the contrary, when the obtained URI does not forward-match a URI that should be accepted by the connection setting CGI program 523, the HTTP request is determined not to be an HTTP request of specific connection setting processing. If the HTTP server module 514 determines that the obtained URI forward-matches a URI that should be accepted by the connection setting CGI program 523, the process advances to step S812. If the HTTP server module 514 determines that the obtained URI does not forward-match a URI that should be accepted by the connection setting CGI program 523, the process advances to step S815.

In step S812, the HTTP server module 514 obtains the state of the communication apparatus 300. In step S813, the HTTP server module 514 determines based on the obtained state whether the communication apparatus 300 is operating in the connection setting mode (state of specific connection setting processing). If the HTTP server module 514 determines that the communication apparatus 300 is operating in the connection setting mode, the process advances to step S814. If the HTTP server module 514 determines that the communication apparatus 300 is not operating in the connection setting mode, the process advances to step S815.

In step S814, the HTTP server module 514 saves a dummy value as an analyzed parameter of the Host header. For example, the HTTP server module 514 saves, as an analyzed parameter of the Host header, a value representing the IP address of the communication apparatus 300 itself such as a header name "Host" and a header value "192.168.1.2". After step S814, in step S809, the HTTP server module 514 determines that the processing is successful, and the subprocess in FIGS. 8A and 8B ends. If the process advances from step S811 or S813 to step S815, the HTTP server module 514 saves information representing that an error in which no Host header exists has occurred. After step S815, the HTTP server module 514 determines that the analysis of the HTTP request has failed, and the subprocess in FIGS. 8A and 8B ends.

In this manner, an HTTP request having no Host header can be permitted by special processing in steps S810 to S814 on condition that it can be analyzed that the HTTP request indicates specific connection setting processing and the communication apparatus 300 is in the specific connection setting mode. In the case of connection setting processing of another method different from specific connection setting processing, it is preferable not to permit an HTTP request having no Host header.

As the special processing in steps S810 to S814, another processing may be performed. As a target analyzed parameter, CGI program, or determination method, another arrangement may be used. For example, when the information processing apparatus 200 requests execution of another application function (for example, print application) different from the specific connection setting processing, if an error may arise from noncompliance of the communication protocol specifications of HTTP, special processing may be performed. For example, even when not the Host header but predetermined information requested by the communication protocol of HTTP does not exist, dummy information may be substituted for the predetermined information.

In the embodiment, the state of the communication apparatus 300 is determined in steps S812 and S813. However, it is also possible not to perform these processes and if it is determined in step S811 that the obtained URI forward-matches a URI that should be accepted by the connection setting CGI program 523, to perform the process in step S814. In the embodiment, a dummy value is stored as a Host header in step S814. However, if it is apparent that no Host header is necessary in the CGI program and the application module, the process in step S809 may be performed without performing step S814. Further, in the embodiment, HTTP has been exemplified as a communication protocol. However, the present disclosure is also applicable to a case in which the communication apparatus 300 provides the application function to the information processing apparatus 200 by using a communication protocol other than HTTP.

In the embodiment, it is determined by forward matching in step S811 whether an HTTP request is an HTTP request of specific connection setting processing. However, another determination method such as perfect matching, backward matching, or partial matching may be adopted. Alternatively, whether an HTTP request represents specific connection setting processing may be decided by determining a value (for example, IPP (Internet Printing Protocol) based on a Content-Type value) included in the header field of the HTTP request. That is, whether an HTTP request represents specific connection setting processing may be determined based on a value included in the HTTP request.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-118128, filed Jul. 16, 2021, which is hereby incorporated by reference herein in its entirety.

What is claimed is:

1. A communication apparatus capable of communicating with an information processing apparatus, comprising:
    a memory containing instructions; and
    a processor to execute the instructions to function as
    a communication unit configured to perform communication between the communication apparatus and the information processing apparatus;
    an analysis unit configured to analyze an execution request of a function of the communication apparatus using a predetermined communication protocol that has been received from the information processing apparatus via the communication unit; and
    an execution unit configured to, when the execution request of the function is determined to not comply with a specification of the predetermined communication protocol because the execution request of the function does not include header information as a result of the analysis by the analysis unit, transmit a response using the predetermined communication protocol on condition that at least the execution request of the function is an execution request of a specific function, and execute the specific function.

2. The apparatus according to claim 1, wherein the execution unit changes the execution request of the function to comply with the specification of the predetermined communication protocol, and executes the specific function.

3. The apparatus according to claim 1, wherein the instructions are further executed to function as a first determination unit configured to determine, based on the result of the analysis by the analysis unit, whether the execution request of the function is the execution request of the specific function.

4. The apparatus according to claim 3, wherein the first determination unit determines, based on whether the execution request of the function includes information representing the execution request of the specific function, whether the execution request of the function is the execution request of the specific function.

5. The apparatus according to claim 4, wherein the information representing the execution request of the specific function is described as a URI (Uniform Resource Identifier).

6. The apparatus according to claim 1, wherein the instructions are further executed to function as a second determination unit configured to determine whether a state of the communication apparatus is a state in which the specific function can be executed,
    wherein the execution unit changes the execution request of the function to comply with the specification of the predetermined communication protocol on condition that the execution request of the function is the execution request of the specific function, and the second determination unit determines that the state of the communication apparatus is the state in which the specific function can be executed.

7. The apparatus according to claim 1, wherein when the execution request of the function is determined as the result of the analysis by the analysis unit not to comply with the specification of the predetermined communication protocol, if the execution request of the function is not the execution request of the specific function, the execution unit executes error processing.

8. The apparatus according to claim 1, wherein when information requested by communication based on the predetermined communication protocol does not exist in the execution request of the function, the execution request of the function is determined not to comply with the specification of the predetermined communication protocol.

9. The apparatus according to claim 8, wherein the information requested by communication based on the predetermined communication protocol is the header information.

10. The apparatus according to claim 9, wherein the execution unit changes the execution request of the function to comply with the specification of the predetermined communication protocol by setting dummy information as the header information in the execution request of the function.

11. The apparatus according to claim 1, wherein the specific function is a function of causing the information processing apparatus to execute setting processing to operate the communication apparatus in a predetermined network configuration.

12. The apparatus according to claim 11, wherein the predetermined network configuration is a configuration of at least one of infrastructure connection and direct connection between the information processing apparatus and the communication apparatus.

13. The apparatus according to claim 1, wherein the communication apparatus is a printer.

14. The apparatus according to claim 1, wherein the predetermined communication protocol is HTTP (HyperText Transfer Protocol).

15. A method comprising:
    communicating with an information processing apparatus;
    analyzing an execution request of a function of a communication apparatus using a predetermined communication protocol that has been received from the information processing apparatus via the communicating; and
    when the execution request of the function is determined to not comply with a specification of the predetermined communication protocol because the execution request of the function does not include header information as a result of the analyzing, transmitting a response using the predetermined communication protocol on condition that at least the execution request of the function is an execution request of a specific function, and executing the specific function.

16. A non-transitory computer-readable storage medium storing a program configured to cause a computer to function to:
    communicate with an information processing apparatus;
    analyze an execution request of a function of a communication apparatus using a predetermined communication protocol that has been received from the information processing apparatus via the communication; and
    when the execution request of the function is determined to not comply with a specification of the predetermined communication protocol because the execution request of the function does not include header information as a result of the analysis, transmit a response using the predetermined communication protocol on condition that at least the execution request of the function is an execution request of a specific function, and execute the specific function.

\* \* \* \* \*